US006132068A

United States Patent [19]

Katsumata

[11] Patent Number: 6,132,068

[45] Date of Patent: *Oct. 17, 2000

[54] VEHICULAR HEADLAMP HAVING A SHADE

[75] Inventor: Toshiyuki Katsumata, Shizuoka, Japan

[73] Assignee: Koito Manufacturing Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/766,852

[22] Filed: Dec. 13, 1996

[30] Foreign Application Priority Data

Dec. 22, 1995 [JP] Japan .................................... 7-350256

[51] Int. Cl.7 ...................................................... B60Q 1/02

[52] U.S. Cl. .......................... 362/351; 362/343; 362/538; 362/539; 362/806

[58] Field of Search .................................... 362/263, 265, 362/293, 298, 305, 538, 539, 351, 297, 346, 516, 517, 518, 806

[56] References Cited

U.S. PATENT DOCUMENTS

| | | | |
|---|---|---|---|
| 4,268,895 | 5/1981 | Yabata | 362/307 |
| 4,271,459 | 6/1981 | James | 362/61 |
| 4,679,127 | 7/1987 | Ernst et al. | 362/294 |
| 4,797,790 | 1/1989 | Brodling et al. | 362/61 |
| 4,922,398 | 5/1990 | Muto | 362/61 |
| 4,926,301 | 5/1990 | Liverance et al. | 362/61 |
| 4,951,178 | 8/1990 | Shirai et al. | 362/61 |
| 4,987,521 | 1/1991 | Fratty et al. | 362/61 |
| 5,070,432 | 12/1991 | Kitazumi et al. | 362/298 |
| 5,081,564 | 1/1992 | Mizoguchi et al. | 362/61 |
| 5,111,368 | 5/1992 | Suzuki et al. | 362/61 |
| 5,195,815 | 3/1993 | Watanabe et al. | 362/61 |
| 5,251,110 | 10/1993 | Leleve | 362/61 |
| 5,260,856 | 11/1993 | Perthus et al. | 362/61 |
| 5,386,348 | 1/1995 | O'Shaughnessey et al. | 362/61 |
| 5,402,325 | 3/1995 | Wisler et al. | 362/61 |
| 5,497,298 | 3/1996 | Luallin et al. | 362/61 |
| 5,497,299 | 3/1996 | Wisler et al. | 362/61 |
| 5,521,798 | 5/1996 | Bertling et al. | 362/61 |

FOREIGN PATENT DOCUMENTS

| | | | |
|---|---|---|---|
| 0 718 545 A1 | 6/1996 | European Pat. Off. . | |
| 0 742 408 A1 | 11/1996 | European Pat. Off. . | |
| 65722 | 3/1956 | France . | |
| 43 34 719 A1 | 4/1996 | Germany . | |

*Primary Examiner*—Thomas M. Sember
*Attorney, Agent, or Firm*—Morgan, Lewis & Bockius LLP

[57] ABSTRACT

A vehicular headlamp includes a bulb for emitting light, a reflector for reflecting the light from the bulb in a light projecting direction of the headlamp; and a shade attached to the reflector for cutting direct light to be emitted forward of the lamp from the bulb. The shade has a shade body for cutting the direct light, and an attachment leg member for attaching the shade to

22 Claims, 3 Drawing Sheets

VEHICULAR HEADLAMP HAVING A SHADE

BACKGROUND OF THE INVENTION

1. Field of the Invention

This invention relates to a vehicular headlamp and, more particularly, to a structure of a shade of the headlamp. A vehicular headlamp, generally, is so constituted that a reflector and lens of the headlamp control distribution of light emitted from a bulb thereof to obtain a predetermined light distribution pattern. In recent years, a headlamp has also been developed in which light distribution control is performed solely by a reflector without relying on any lens to create a predetermined light distribution pattern.

2. Description of Related Art

In such a headlamp, if emitted forward from the lamp, light proceeding upward may give glare to drivers of oncoming vehicles and pedestrians. It is therefore essential to obtain a light distribution pattern in which upwardly directed light is suppressed as much as possible when an auxiliary lamp is turned on. Many conventional headlamps have adopted structures in which a shade is attached to a reflector to cut direct light rays emitted from the headlamp forward from a bulb.

The shade is subject to high temperatures due to heat from the bulb. Also, the shade is generally made of a metal, and formed in an integrated body by a drawing process or a bending process. However, with the headlamp having such a shade, the following problems arise. That is, as described above, in a recent headlamp, since the reflector thereof distributes light rays where the lens thereof tends to be formed as plain glass or in a condition close to it, the shade is readily visible from the outside of the headlamp. Therefore, it is necessary to provide the shade with ornamental qualities as well as shielding function.

Though the shade needs to be formed with a shade body for cutting the direct light and an attachment leg member for securing the shade to a reflector, it would be difficult to obtain a shade in a desired shape because a crack may occur when molded if the shade shape is complicated where the shade body and the attachment leg member are formed by a drawing process. Accordingly, when an attempt is made to provide ornaments or a decorated surface of a three-dimensional pattern, a shade body would hardly be formed due to restrictions imposed from workability of press molding.

In contrast, if the shade is formed by a bending process, restrictions likewise in the case of the drawing process would be less in terms of molding. However, shade shapes formable by such a bending process themselves are limited from the outset, and therefore, it is more difficult to obtain a shade worth admiring than in the case of the drawing process.

SUMMARY OF THE INVENTION

This invention is conceived based on such backgrounds, and it is an object of the invention to provide a vehicular headlamp with a shade, wherein the shade which has a distinguished outward appearance when observed from the exterior of the headlamp and can be readily fabricated.

This invention is to accomplish the object above by constituting that a shade is completed by connecting a shade body for cutting direct light with an attachment leg member for attaching the shade to a reflector where those are formed as separate bodies. In a vehicular headlamp having a bulb, a reflector for reflecting light from the bulb forward, and a metal shade for cutting direct light to be emitted forward of the lamp from the bulb, the shade is formed by connecting a shade body cutting the direct light and an attachment leg member, which are formed as separate bodies, and the shade is attached by the attachment leg member to the reflector. The attachment leg member can have a single leg or plural number of legs and may be formed by a rolling process to reduce its manufacturing costs.

According to preferred embodiments of the invention, an annular member may be extensively formed at a front end of the attachment leg member to make easier the connection work between the shade body and the attachment leg member. A three-dimensional pattern may be formed on the shade body. The three-dimensional pattern is preferably designed to meet or correspond pitch of a shape of a reflecting surface of the reflector, thereby giving a distinguished appearance when observed from the outside of the headlamp. The shade body and the attachment leg member can be formed to be different in thickness. When the shade body is formed thinner than the attachment leg member, a shade with an excellent shockproof and impact resistance is obtainable. When the shade body is formed thicker than the attachment leg member, the shade body has an improved heat resistance. The thickness ratio of the shade body to the attachment leg member can be properly set in accordance with a performance required for an individual lamp. Moreover, a rear end opening of the shade body may be formed with a larger diameter than that of the front end opening of the annular member to fit the shade body to the annular member from its exterior.

When the rear end of the annular member is designed to be capable of cutting direct light directing non-effective portions of the reflector from the bulb by the annular member, straying light that is harmful for the purpose of light distribution can be prevented from being emitted forward. The non-effective portion means a portion on the reflector which does not contribute to the formation of light distribution. Moreover, since the annular member is formed as a part of the attachment leg member, the rear end of the annular member is positioned with a high precision with respect to the reflector.

BRIEF DESCRIPTION OF THE DRAWINGS

The above and other objects and features of the invention will be apparent to those skilled in the art from the following preferred embodiments thereof when considered in conjunction with, the accompanying drawings, in which.

DETAILED DESCRIPTION OF PREFERRED EMBODIMENTS

Figure 1:
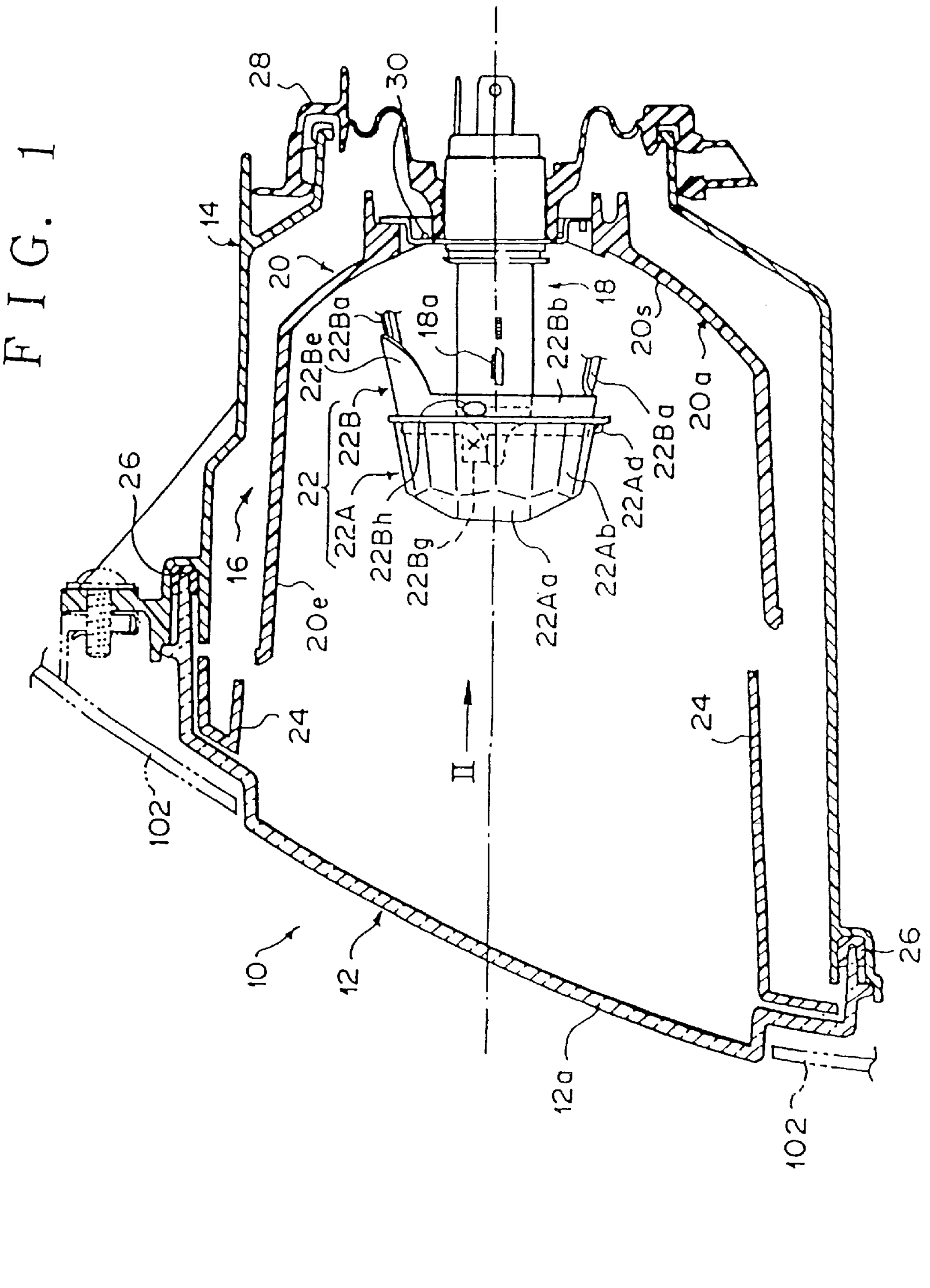
FIG. 1 is a side sectional view showing a vehicular headlamp according to an embodiment of the invention.

Hereinafter, referring to the drawings, embodiments of the invention will be described. FIG. 1 is a side sectional view showing a vehicular headlamp according to an embodiment of the invention.

In the headlamp 10, a reflector unit 16 is aimably disposed within a lamp chamber formed of a lens 12 and a body 14, and the reflector unit 16 includes a bulb 18, a reflector 20, and a shade 22.

A portion of the lens 12 located in front of the reflector unit 16 is formed of a plain glass having no light distribution function. The lens 12 is so formed stepwise that an effective portion 12*a* of the lens 12 forms substantially the same level as a panel surface 102 of a vehicle body. An extension 24 is disposed on an inner side of the lens 12 to hide a portion except a reflecting surface 20*a* of the reflector 20 as the headlamp interior. The extension 24 is mounted at a non-effective portion of the lens 12, and the lens 12 is attached to the body 14 by a sealing agent 26. A socket cover 28 is attached to a rear end opening of the body 14.

Figure 2:
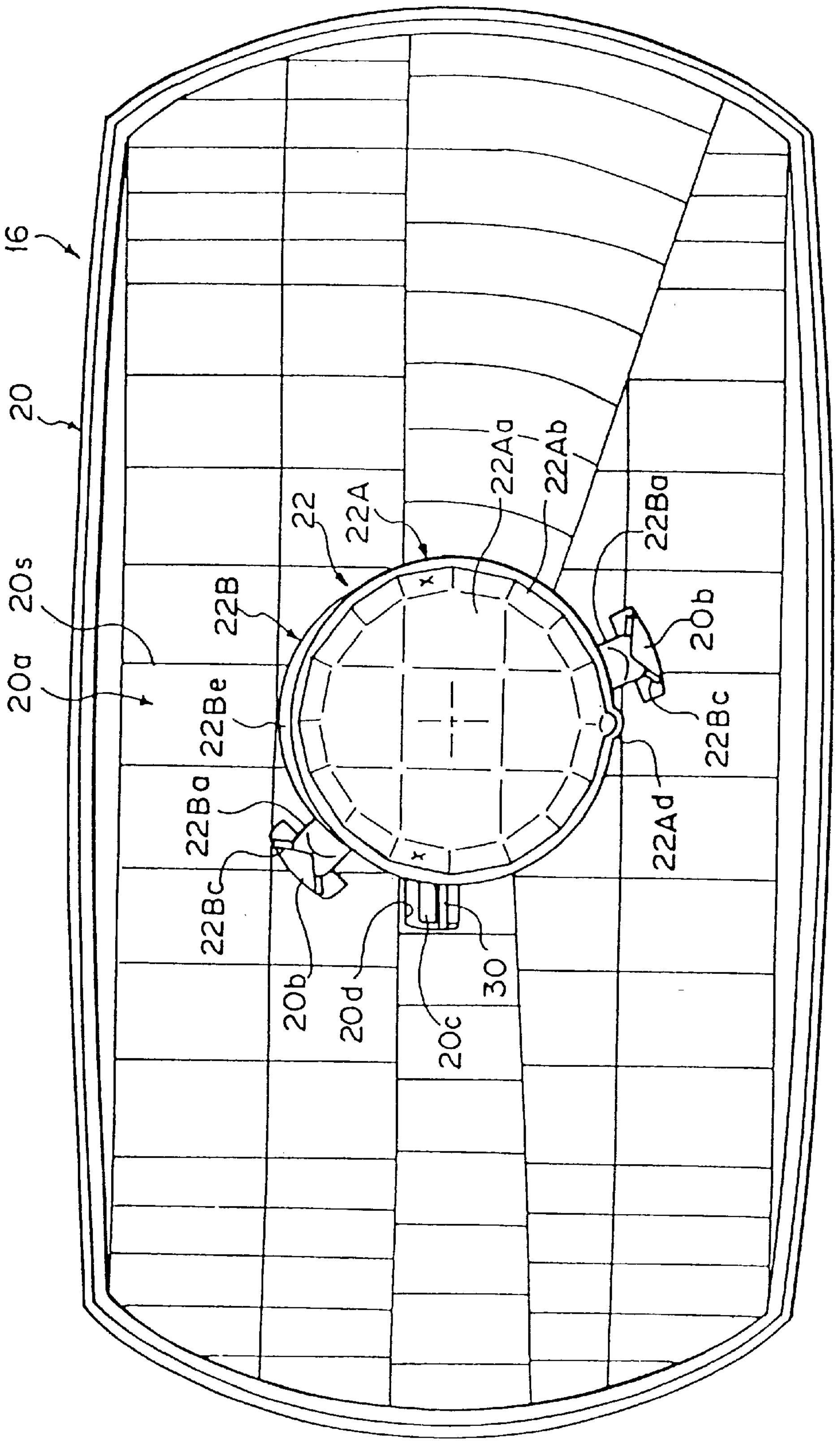
FIG. 2 is a diagram showing a reflector unit of the headlamp taken along arrow II direction in FIG. 1.

The bulb 18 is an H4 bulb having a double filament of so-called C-8 type. The bulb 18 is secured to the reflector 20 by a wire spring 30, and the socket cover 28 is attached onto the bulb 18. The reflector 20 is a reflector made of FRP (Fiber-Reinforced Plastic), having the reflecting surface 20*a* on which plural steps 20*s*, or lines between angled faces, for light distribution are formed on a datum parabolic surface, controlling light distribution of light incident to the reflecting surface 20*a* from an auxiliary filament 18*a* of the bulb 18 to form a predetermined light distribution pattern. As shown in FIG. 2, the steps 20*s* for light distribution control are formed in approximately rectangular and fan shapes. A pair of shade attachments 20*b* and a hole 20*d* which allows a spring retaining portion 20*c* for retaining the wire spring 30 to be formed around a rearmost portion of the reflecting surface 20*a* of the reflector 20.

The shade 22 is made of a steel plate whose surface is chromium-plated and formed by connecting a shade body 22A with an attachment leg unit 22B, which are formed as separate bodies. In this shade 22, the shade body 22A cuts direct light emitted from the auxiliary filament 18*a* of the bulb 18 toward the front of the headlamp, and the attachment leg unit 22B attaches the shade 22 to the reflector 20. The shade body 22A is formed by a drawing process, whereas the attachment leg unit 22B is formed by a rolling process. The shade body 22A is formed with thicker than the attachment leg unit 22B.

Although the shade body 22A is formed in a cup shape as to surround a front end of the bulb 18, formed on a surface of the shade body 22A is not a normal shape such that a part of a sphere is simply connected to a front end of a cone base but an uneven pattern, or a three-dimensional pattern. That is, as shown in FIG. 2, a front face 22A*a* is formed in a grid-shaped polygonal body of an approximately square as meeting or corresponding to pitch of the steps 20*s* for light distribution control of the reflecting surface 20*a* of the reflector 20. A side face 22A*b* is formed in a truncated pyramid shaped polygonal body.

Figure 3:
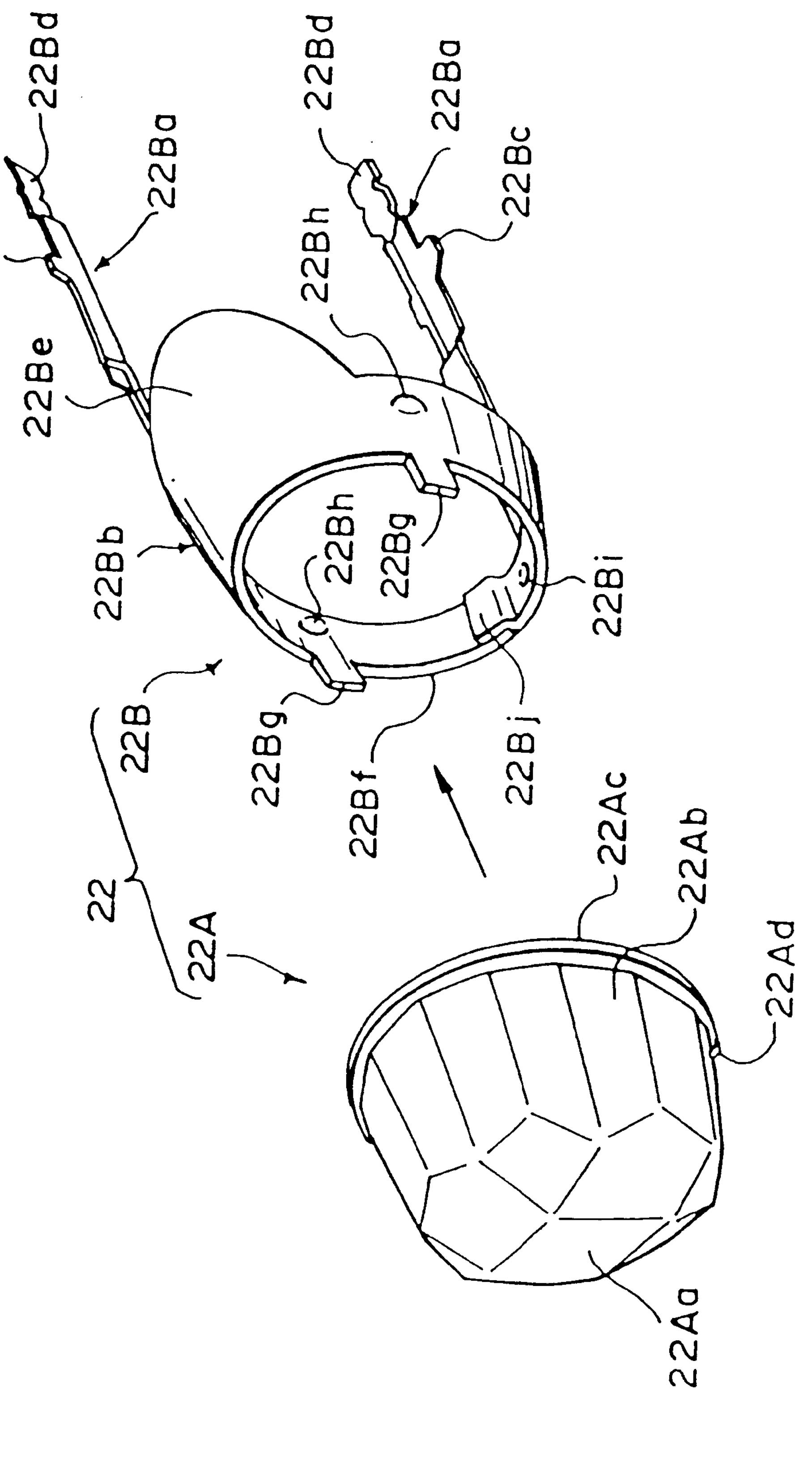
FIG. 3 is an exploded perspective view showing a shade of the headlamp as a single article.

The attachment leg unit 22B is, as shown in FIG. 3, constituted of a pair of attachment legs 22B*a,* and an annular member 22B*b* extensively formed at a front end of the attachment legs 22B*a,* and both of the attachment legs 22B*a* are in a form extending rearward from the annular member 22B*b* with a predetermined angle therebetween. The respective attachment legs 22B*b* attached to the reflector 20 by riveting rivet pieces 22B*d* of the rear end thereof to the rearmost portion of the reflector 20 while a pair of nails 22B*c* formed at the respective attachment legs 22B*a* are in contact with the shade attachments 20*b* of the reflector 20. The annular member 22B*b* is formed approximately in a cone shape, at an upper portion of which a light shield 22B*e* is formed as to project rearward. A rear end shape of the light shield 22B*e* is designed in a curved shape capable of cutting, by the light shield 22B*e,* direct light rays to an upper inner wall face 20*e* (non-effective portion) of the reflector 20 from the auxiliary filament 18*a* of the bulb 18. Moreover, a pair of connection pieces 22B*g* are formed forward-projectingly at two right and left portions of the front end opening 22B*f* of the annular member 22B*b*.

Although the front end opening 22B*f* of the annular member 22B*b* and the rear end opening 22A*c* of the shade body 22A, both, are formed in a circular shape, the rear end opening 22A*c* of the shade body 22A is formed with a larger diameter than that of the front end opening 22B*f* of the annular member 22B*b*. As shown in FIG. 3 by an arrow, the shade body 22A and the attachment leg unit 22B are jointed by a spot welding of both while the shade body 22A is fitted to the annular member from the outside of the annular member 22B*b*.

The spot welding is performed using portions of the pair of the connection pieces 22B*g* (see, x mark in FIGS. 1, 2). To position the shade body 22A and the attachment leg unit 22B in a front to back direction at the time of the spot welding, a pair of bumps 22B*h* is formed at two left and right portions of the annular member 22B*b*. To position the shade body 22A and the attachment leg unit 22B in a rotational direction at the time of the spot welding, a bump 22B*i* is formed at a lower end of the annular member 22B*b,* and a bump 22A*d* to engage the bump 22B*i* is formed at a lower end of the rear end opening of the shade body 22A. As described above, though the attachment leg unit 22B is formed by the rolling process, a connected portion 22B*j* at which ends of a material forming the unit are overlapped during the rolling process is set near the bump 22B*i* at the lower end of the annular member 22B*b*.

As described in detail, in this embodiment, though the shade 22 is completed, where the shade body 22A for cutting direct light and the attachment leg unit 22B for attaching the shade to the reflector 20 are formed as separate bodies, by connecting them with each other, the respective shapes of the shade body 22A and the attachment leg unit 22B serving as shade components are extremely easy to be assembled in comparison with the shape of the shade as the complete article, so that those are formable even when the shade body 22A and the attachment leg unit 22B are required to be complicated shapes.

According to this embodiment, in the vehicular headlamp having a shade, the shade 22 which has a distinguished outward appearance when observed through the lens 12 of the plain glass from the outside of the headlamp can be easily manufactured. The shade body 22A easily seen from the outside of the lamp, is formed in a polygonal shape, formed with the three-dimensional pattern, and formed to meet the step pitch of the steps 20*s* for light distribution of the reflecting surface 20*a* of the reflector 20, so that the looks of the shade 22 and even the entire lamp can be improved.

That is, as a specific example, where a three-dimensional or stepwise pattern is formed on a reflecting surface 20*a* of the reflector 20, a shape of the shade body or a three-dimensional pattern of a surface of the shade body is designed particularly to meet or correspond to the three-dimensional pattern on the reflecting surface 20*a*. In such a case, the three-dimensional pattern on the surface of the shade body 22A is not limited to specific patterns as far as formed based on the surface 20*a*, and for example, a three-dimensional pattern can be formed by forming the shade body in a polygon body shape, a wave shape, etc.

In this embodiment, since the shade body 22A is formed thicker than the attachment leg unit 22B by utilizing an advantage that the shade body 22A and the attachment leg unit 22B are formed as separate bodies, the shade body 22A, which tends to be subject to a high temperature, can have an improved heat resistance thereof. Alternatively, if the shade body 22A is formed with thinner than the attachment leg unit 22B, the shade 22 would possess an excellent shockproof and impact resistance. Since the shade body 22A and the attachment leg unit 22B are formed as separate bodies, the most suitable shade can be manufactured in accordance with the headlamp shape, design, etc. by connecting a shade body having a three-dimensional pattern different from that of the shade body 22 with the attachment leg unit 22B, and therefore, the shade components can have general purposes.

The connecting work between the shade body 22A and the attachment leg unit 22B can be made easier because the attachment leg unit 22B is composed of the pair of the attachment legs 22B*a* and the annular member 22B*b* extensively formed at the front end thereof, and because the shade body 22A is connected at the annular member 22B*b*. At that time, since the rear end opening 22A*c* of the shade body 22A is formed with the larger diameter than that of the front end opening 22B*f* of the annular member 22B*b,* and since the shade body 22A and the attachment leg unit 22B are connected by fitting the shade body 22A to the annular member 22B*b* from the outside thereof, the welding work can be done easily, and a gap between the shade body 22A and the annular member 22B*b* created by this connection can be hidden when seen from the outside of the headlamp, thereby preventing the shade 22 from losing its distinguished appearance. The annular member 22B*b* can prevent stray light, which is harmful for light distribution, from being emitted forward of the lamp, because the rear end shape of the annular 22B*b* member is designed to be capable of cutting the direct light to the upper inner wall face 20*e* of the reflector 20 from the auxiliary filament 18*a* of the bulb 18. At that time, since the annular member 20B*b* is formed as a part of the attachment leg unit 22B attached to the reflector 20, the rear end can be positioned with an extremely high precision with respect to the reflector 20.

In this embodiment, since the attachment leg unit 22B is formed by the rolling process in utilizing the advantage that the shade body 22A and the attachment leg unit 22B are formed as separate bodies, the headlamp can be formed with a lower cost in comparison with a fabrication by a drawing process or the like.

It is to be noted that since the shade body and the attachment leg member are formed as separate bodies, shades having different shapes can be manufactured using the same components by changing their connecting position, so that the shade components can have general-purposes. For example, it would be preferable to change the position of the attachment leg member between a left light distribution device and a right light distribution device, and in such a case, with this invention, preparing only parts of one kind is adequate, thereby enabling manufacturing costs for the shades to be reduced. On the other hand, if plural kinds of each of the shade body and the attachment leg member are prepared, the most suitable shade can be manufactured by properly combining the shade body with the attachment leg member in accordance with lamp designs or shapes.

The foregoing description of a preferred embodiment of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is to be noted that the scope of the invention is not limited to what has been described hitherto but defined by the claims as set forth hereinafter.

What is claims is:

1. A vehicular headlamp, comprising:

a bulb;

a reflector for reflecting light from the bulb in a light projecting direction substantially parallel to an optical axis defined by the bulb and the reflector; and a shade surrounding the bulb made of a metal and attached to the reflector for cutting substantially all direct light to be emitted from the bulb in the light projecting direction along the optical axis defined by the bulb and the reflector, said shade including:

a shade body disposed on the optical axis defined by the bulb and the reflector for cutting the direct light; and an attachment leg member for attaching the shade to the reflector, the attachment leg member formed as a separate body from the shade body and connected with the shade body to form the shade, wherein the attachment leg member includes an annular member formed at an end of the attached leg member and at least a connection piece formed on a front end opening of the annular member to connect the shade body with the attachment leg member.

2. The vehicular headlamp as set forth in claim 1, wherein the shade body is formed with a three-dimensional pattern on a surface of the shade body, the three-dimensional pattern being designed to meet a pitch of a shape of a reflecting surface of the reflector.

3. The vehicular headlamp as set forth in claim 1, wherein a thickness of the shade body is greater than a thickness of the attachment leg member.

4. The vehicular headlamp as set forth in claim 1, wherein a thickness of the shade body is less than a thickness of the attachment leg member.

5. The vehicular headlamp as set forth in claim 1, wherein the shade body has an opening of a larger diameter than a diameter of the annular member such that an interior of the shade body fits an exterior of the annular member to connect the shade body with the annular member.

6. The vehicular headlamp as set forth in claim 1, wherein the annular member has a rear end edge whose shape is designed to be capable of cutting direct light directed from the bulb to a non-effective region of the reflector.

7. The vehicular headlamp as set forth in claim 1, wherein the attachment leg member is fabricated by a rolling process.

8. The vehicular headlamp as set forth in claim 1, wherein the attachment leg member has multiple legs.

9. The vehicular headlamp as set forth in claim 1, wherein the attachment leg member has a pair of legs located on substantially opposing sides of the bulb.

10. The vehicular headlamp as set forth in claim 1, wherein the shade body is formed with a three-dimensional pattern on a surface of the shade body corresponding to a three-dimensional pattern of the reflector.

11. The vehicular headlamp as set forth in claim 1, wherein the shade body has an opening of a larger diameter than a diameter of the annular member.

12. The vehicular headlamp as set forth in claim 1, wherein an interior of the shade body fits an exterior of the annular member to connect the shade body with the annular member.

13. A manufacturing method for a vehicular headlamp having a shade, the method comprising the steps of:

preparing a reflector for reflecting light emitted from a bulb in a light projecting direction substantially parallel to an optical axis defined by the bulb and the reflector;

preparing a shade body for surrounding the bulb and having a portion disposed on the optical axis defined by the bulb and the reflector to cut substantially all direct light to be emitted from the bulb in the light projecting direction along the optical axis defined by the bulb and the reflector;

preparing an attachment leg member for attaching the shade body to the reflector, the attachment leg member being formed as a separate body from the shade body;

connecting the shade body and the attachment leg member with each other to form a shade; and assembling the shade, the bulb, and the reflector to manufacture the vehicular headlamp by attaching the shade to the reflector using the attachment leg member of the shade, wherein the attachment leg member includes an annular member formed at an end of the attached leg member and at least a connection piece formed on a front end opening of the annular member to connect the shade body with the attachment leg member.

14. The manufacturing method as set forth in claim 13, wherein the shade body is connected to the attachment leg member by spot welding.

15. The manufacturing method as set forth in claim 13, wherein the shade body is connected to the attachment leg member after the shade body is positioned with respect to the attachment leg member using bumps formed on the shade body and the attachment leg member.

16. The manufacturing method as set forth in claim 13, wherein the shade is attached to the reflector by rivets.

17. The manufacturing method as set forth in claim 12, wherein two vehicular headlamps are manufactured, the shade body of each respective vehicular headlamp being connected to each respective attachment leg members to produce shades of two different types.

18. The manufacturing method as set forth in claim 17, wherein the two different types respectively correspond to left and right sides of an automobile.

19. A vehicular headlamp, comprising:

a bulb for emitting light;

a reflector disposed around the bulb for reflecting the light emitted from the bulb in a light projecting direction substantially parallel to an optical axis defined by the bulb and the reflector; and a shade surrounding the bulb for cutting substantially all direct light to be emitted from the bulb in the light projecting direction along the optical axis defined by the bulb and the reflector, said shade having a shade body disposed on the optical axis defined by the bulb and the reflector to cut the direct light to be emitted from the bulb in the light projecting direction along the optical axis defined by the bulb and the reflector and an attachment leg member for securing the shade body to the reflector, wherein the attachment leg member includes an annular member formed at an end of the attached leg member and at least a connection piece formed on a front end opening of the annular member to connect the shade body with the attachment leg member.

20. A manufacturing method for a vehicular headlamp having a reflector and a shade, the method comprising the steps of:

preparing a shade body for surrounding a bulb to cut direct light to be emitted from the bulb along an optical axis defined by the bulb and the reflector;

preparing an attachment leg member for attaching the shade body to the reflector, the attachment leg member being formed as a separate body from the shade body;

spot welding the shade body and the attachment leg member with each other to form a shade; and assembling the shade, the bulb, and the reflector to manufacture the vehicular headlamp by attaching the shade to the reflector using the attachment leg member of the shade such that a portion of the shade body and the bulb are disposed on the optical axis defined by the bulb and the reflector, wherein the attachment leg member includes an annular member formed at an end of the attached leg member and at least a connection piece formed on a front end opening of the annular member to connect the shade body with the attachment leg member.

21. A manufacturing method for a vehicular headlamp having a shade, the method comprising the steps of:

preparing a shade body for surrounding a bulb to cut direct light to be emitted from the bulb;

preparing an attachment leg member for attaching the shade body to a reflector, the attachment leg member being formed as a separate body from the shade body;

connecting the shade body and the attachment leg member with each other to form a shade; and assembling the shade, the bulb, and the reflector to manufacture the vehicular headlamp by attaching the shade to the reflector using the attachment leg member of the shade, wherein the shade body is connected to the attachment leg member after the shade body is positioned with respect to the attachment leg member using bumps formed on the shade body and the attachment leg member, wherein the attachment leg member includes an annular member formed at an end of the attached leg member and at least a connection piece formed on a front end opening of the annular member to connect the shade body with the attachment leg member.

22. A manufacturing method for a vehicular headlamp having a reflector and a shade, the method comprising the steps of:

preparing a shade body for surrounding a bulb to cut direct light to be emitted from the bulb in a light projecting direction of the headlamp along an optical axis defined by the bulb and the reflector;

preparing an attachment leg member for attaching the shade body to the reflector, the attachment leg member being formed as a separate body from the shade body;

connecting the shade body and the attachment leg member with each other to form a shade; and assembling the shade, the bulb, and the reflector to manufacture the vehicular headlamp by riveting the shade to the reflector using the attachment leg member of the shade such that a portion of the shade body and the bulb are disposed on the optical axis defined by the bulb and the reflector, wherein the attachment leg member includes an annular member formed at an end of the attached leg member and at least a connection piece formed on a front end opening of the annular member to connect the shade body with the attachment leg member.

* * * * *